(12) United States Patent
Bellise et al.

(10) Patent No.: US 10,774,900 B2
(45) Date of Patent: Sep. 15, 2020

(54) EYELET ASSEMBLY

(71) Applicant: Duro Dyne Corporation, Bay Shore, NY (US)

(72) Inventors: Andrew J. Bellise, Farmingdale, NY (US); David B. Krupnick, Mattituck, NY (US)

(73) Assignee: Duro Dyne Corporation, Bay Shore, NY (US)

( * ) Notice: Subject to any disclaimer, the term of this patent is extended or adjusted under 35 U.S.C. 154(b) by 0 days.

(21) Appl. No.: 16/404,803

(22) Filed: May 7, 2019

(65) Prior Publication Data

US 2019/0338828 A1 Nov. 7, 2019

Related U.S. Application Data

(60) Provisional application No. 62/667,956, filed on May 7, 2018.

(51) Int. Cl.
| | | |
|---|---|---|
| *F21V 21/00* | (2006.01) | |
| *F16G 11/02* | (2006.01) | |
| *F21S 8/06* | (2006.01) | |
| *F16G 11/14* | (2006.01) | |

(52) U.S. Cl.
CPC .......... *F16G 11/02* (2013.01); *F16G 11/146* (2013.01); *F21S 8/061* (2013.01)

(58) Field of Classification Search
CPC ...... F16G 11/02; F16G 11/146; F16G 11/025; F16G 11/143; F21S 5/061
USPC ........................................................ 362/396
See application file for complete search history.

(56) References Cited

U.S. PATENT DOCUMENTS

| | | | |
|---|---|---|---|
| 1,643,110 A | 9/1927 | Briggs | |
| 1,845,273 A | 2/1932 | Hosking | |
| 2,536,862 A | 1/1951 | White | |
| 2,814,861 A | 12/1957 | O'Connell | |
| 2,911,753 A * | 11/1959 | Beckett | A01K 83/06 43/43.2 |
| 3,006,983 A | 10/1961 | McDurmont | |
| 3,335,468 A | 8/1967 | Harley | |
| 3,824,655 A * | 7/1974 | Hills | A45C 11/323 24/601.3 |
| D263,021 S * | 2/1982 | Siegfried | D11/5 |
| 4,547,035 A | 10/1985 | Espiritu | |

(Continued)

FOREIGN PATENT DOCUMENTS

CA     2431350 A1    12/2004

OTHER PUBLICATIONS

International Search Report dated Jul. 3, 2019, in a corresponding foreign application.

*Primary Examiner* — Ali Alavi

(74) *Attorney, Agent, or Firm* — Scully Scott Murphy and Presser

(57) ABSTRACT

The disclosure concerns an eyelet assembly comprising a shank; and an eyelet portion connected to an end of the shank, the eyelet portion comprising a first prong and a second prong, the first prong being longer than the second prong, the first and second prongs being substantially arcuate and forming a substantially circular aperture, the first and second prongs at an axial angle relative to each other to form a slot. The assembly can be used to suspend or hang lighting fixtures such as LED flat panels at desired angles of display.

8 Claims, 5 Drawing Sheets

(56) References Cited

U.S. PATENT DOCUMENTS

Figure 3:
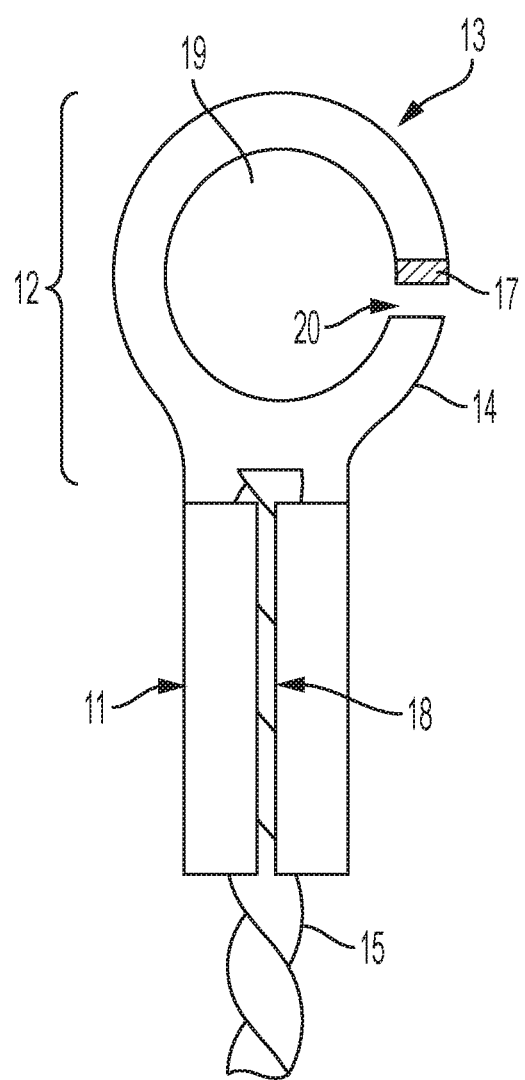

| | | | | |
|---|---|---|---|---|
| 4,875,653 | A | * | 10/1989 | Connolly ............... A47G 7/047 |
| | | | | 248/332 |
| 5,012,398 | A | | 4/1991 | Jones et al. |
| 5,152,630 | A | | 10/1992 | Walloch |
| 5,231,752 | A | | 8/1993 | Hereford |
| 5,875,584 | A | * | 3/1999 | Gowing ................ A01K 83/00 |
| | | | | 43/44.82 |
| 6,361,384 | B1 | * | 3/2002 | Manor .................. H01R 4/307 |
| | | | | 439/557 |
| D464,559 | S | * | 10/2002 | Bjorklund ...................... D8/356 |
| 6,629,675 | B1 | * | 10/2003 | Bjorklund ............... H02G 3/30 |
| | | | | 248/49 |
| 6,945,676 | B1 | * | 9/2005 | Scott ...................... F16B 45/02 |
| | | | | 24/598.4 |
| 9,166,303 | B2 | | 10/2015 | Khansa et al. |
| 2005/0207838 | A1 | | 9/2005 | Striebel et al. |
| 2013/0094230 | A1 | | 4/2013 | Verfuerth et al. |

\* cited by examiner

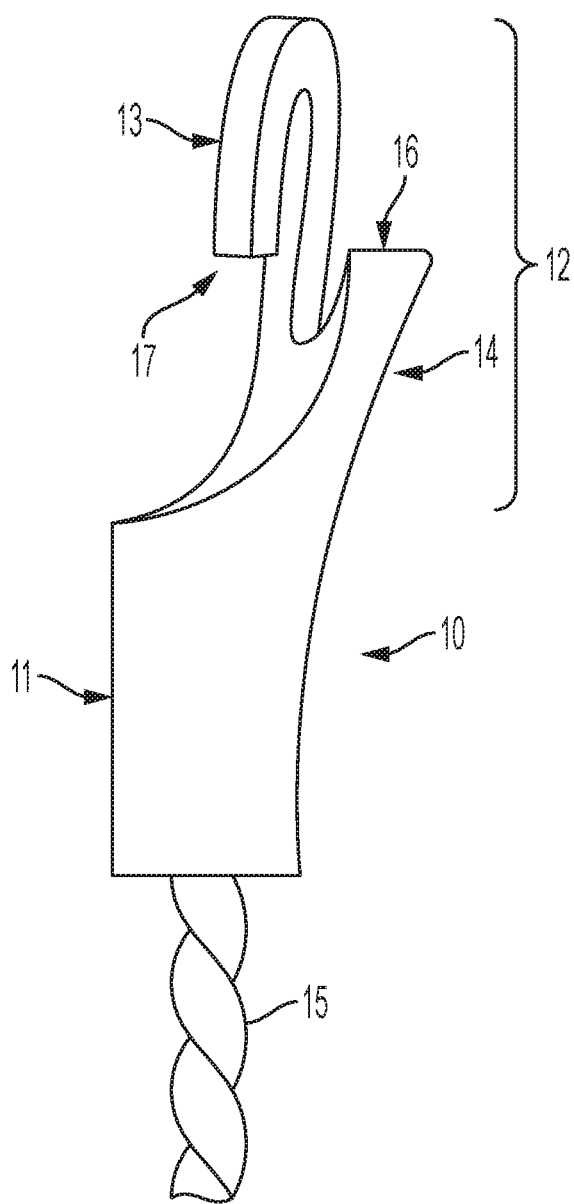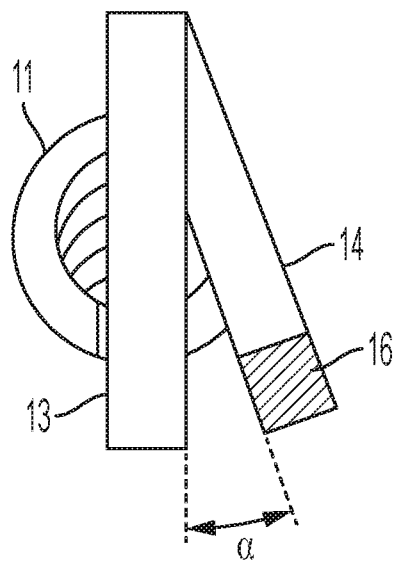
FIG. 1
FIG. 2

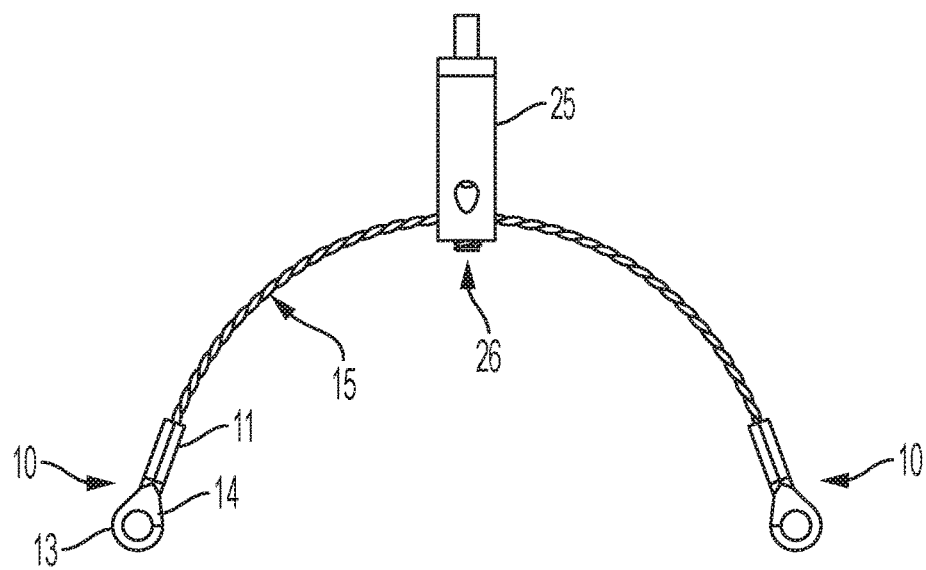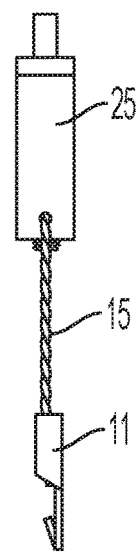
FIG. 6A  FIG. 6B
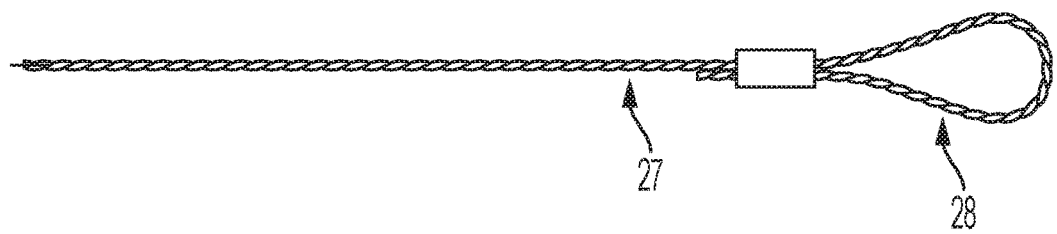
FIG. 7

EYELET ASSEMBLY

CROSS-REFERENCE TO RELATED APPLICATIONS

This application claims the benefit of U.S. Provisional Application No. 62/667,956 filed on May 7, 2018, the entire contents of which are incorporated herein by reference.

One embodiment disclosed herein is an eyelet assembly for securing fixtures such as hanging fixtures, including lighting fixtures such as LEDs and LED flat panels. The eyelet assembly may be swaged and is comprised of an eyelet portion that is connected to a shank. The eyelet portion and shank may be comprised of metal and/or metal alloys, such as stainless steels, e.g. 304 stainless steel, or may be comprised of other deformable materials.

The eyelet portion and shank may be integrally formed, or the eyelet and shank may be separate pieces and attached to each other by means known in the art, e.g. welding and the like. Without limitation, the shank is dimensioned to receive a wire rope (the term "wire rope" as used herein also includes cables, coated wires, lines, and the like) and is designed to be secured to same by means known in the art, e.g. by being swaged or crimped, around the wire rope or cable to secure a fit. The eyelet portion may be of any opening shape, e.g. round, ovate, square and the like. The eyelet portion is not contiguous around its perimeter, but has a slot located therein. The slot may be at any location on the perimeter. The eyelet portion is comprised of a first prong and a second prong; in one embodiment, the first prong is longer that the second prong, including, e.g., from about 2.5 times to about 4 times longer, or within the ranges as otherwise disclosed hereinbelow.

In one practice, the first and second prongs are substantially arcuate and can be configured to create a substantially circular aperture; other shapes may be employed; the aperture is not contiguous. That is, the ends of the first and second prongs are separated and angled relative to each other thereby forming a slot; in one embodiment, the terminal ends of the prongs are on substantially the same plane, so that when they are pressed together the slot substantially closes with little or no remaining gap. The prongs are angled relative to each other at an angle $\alpha$, as measured axial to the eyelet portion. which angle is greater than zero degrees and up to about 90° or more. In one embodiment, angle $\alpha$ can be about 10° to about 75°; or about 15° to about 60°; or about 20° to about 45°. In one practice, angle $\alpha$ is about 10° to about 30°. The recitation of degree ranges includes all degrees and sub-ranges of degrees therebetween. In one embodiment, an eyelet assembly of the disclosure may be attached to each end of a wire rope, the eyelet assemblies in this case may be of the same or different design as disclosed herein. In another embodiment the wire rope passes through one or more grippers as commercially available and known in the art, which can be secured to a ceiling or other surface or other wire ropes in ways also known in the art.

In another embodiment, the eyelet assembly is secured to a fixture, such as a lighting fixture, e.g. an LED flat panel. The eyelet assembly may be secured directly to the fixture or may by secured to same via an intermediate structure, such as without limitation a grid clip or the like. In one embodiment, the intermediate structure, such as a gird clip, has projection thereon comprising at least one hole therethrough, which may be pre-drilled or drilled on site. In one practice the intermediate structure is attached to the fixture and one of the prongs of the eyelet portion is inserted through the hole. The eyelet portion is then closed, e.g. by compressive force, such as by use of pliers on the prongs, to close the slot thereby looping the eyelet portion through the hole.

The eyelet assembly can be made by metal working procedures known in the art, or can be made by modifying commercially available swaged eyelet assemblies to create prongs, slot, an angle $\alpha$.

In one practice, one or more intermediate structures, e.g. grid clips, are attached to a fixture, such as a lighting fixture, to obtain a desired angle of display or for balance, e.g. the gird clips may be on opposite sides of the fixture. The fixture is hung using one or more wire ropes having the eyelet assembly of the disclosure on the ends of same, the eyelet portions being secured to the grid clips as described hereinabove. The fixture can then be hung using, e.g. one or more grippers through which the wire ropes pass either individually or collectively.

In another embodiment, a kit is provided. The kit comprises at least one eyelet assembly as disclosed herein and at least one wire rope; the kit optionally further contains at least one or more of the following: a gripper, a cable (e.g. a looped cable), a grid clip, a frame for a lighting fixture, a lighting fixture (e.g. an LED or LED flat panel).

The disclosure will now be further described by reference to the embodiment shown in the Figures. It will be understood that these depicted embodiments are representative only and not limiting to the scope of the instant disclosure.

FIGS. 1 and 2 respectively depict a perspective and top view of the eyelet assembly 10 of the disclosure. The eyelet assembly comprises shank 11 connected to eyelet portion 12. In the embodiment shown, the eyelet portion and the shank are integrally formed, e.g. from stainless steel. Shank 11 is deformable to be swaged around wire rope 15. Eyelet portion 12 is comprised of first prong 13 and second prong 14. In the embodiment shown, prong 13 is longer than prong 14; in one practice, prong 13 is longer than prong 14. E.g. prong 13 is up to about three times (3×), including about 3× as long as prong 14; in other practices, prong 13 is about 2.5× to about 4× longer than the second prong; or about 2.75× to about 3.75× as long as the second prong; or about 3.25× to about 3.5× as long as the second prong 14; the ranges related include all lengths and sub-ranges in between. As depicted, but without limitation, prongs 13 and 14 are substantially arcuate. Prongs 13 and 14 terminate in end portions 17 and 16 respectively and are offset or bent relative to each other by angle $\alpha$.

Figure 4:
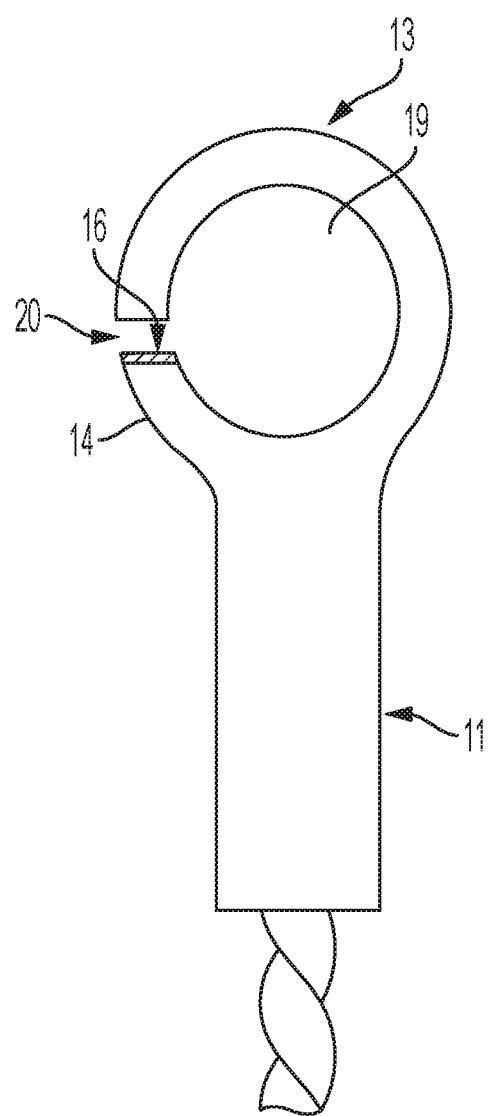

FIGS. 3 and 4 respectively depict front and back views of eyelet assembly 10 of FIGS. 1 and 2. Prongs 13 and 14 are configured to form eyelet aperture 19, the prongs being separated by slot 20 in the perimeter of the eyelet formed by the prongs. As depicted, because prong 13 is longer than prong 14 (as shown, about 3× longer), slot 20 is located approximately one quarter of the way around the perimeter relative to shank 11; other locations for slot 2o may be used by varying the length of prong 13 relative to prong 14. In FIG. 3, prong 13 is angled toward the viewer thus revealing its terminating end portion 17. FIG. 3 also shows the swaged connection 18 of shank 11. In FIG. 4, prong 14 is angled toward the viewer thus revealing its terminating end portion 16. The shape of eyelet assembly 12 is depicted as substantially circular but other geometries can be used as aforesaid.

Figure 5A:
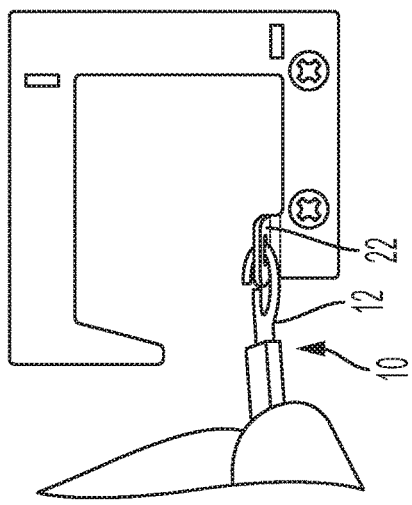
Figure 5B:
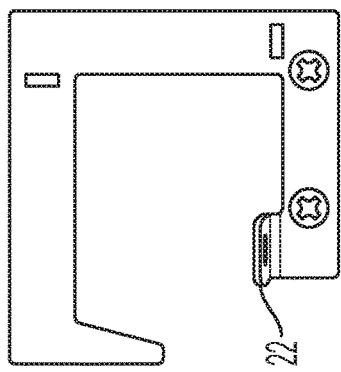
Figure 5C:
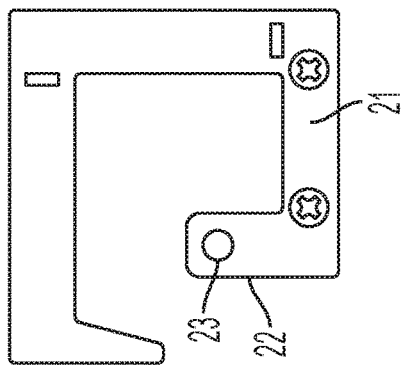
Figure 5E:
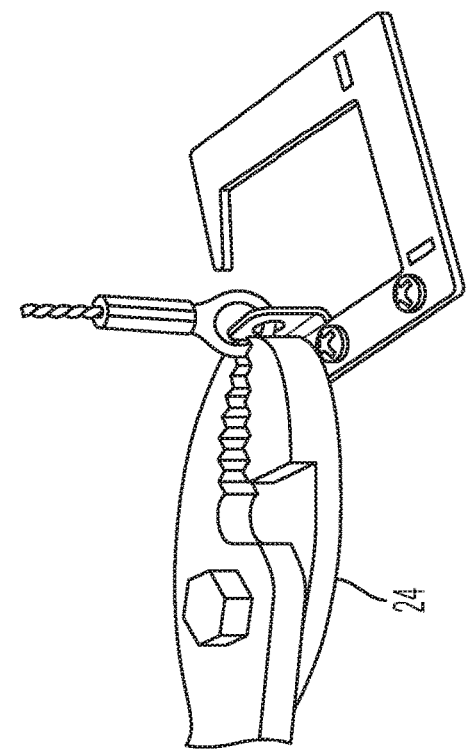
Figure 5D:
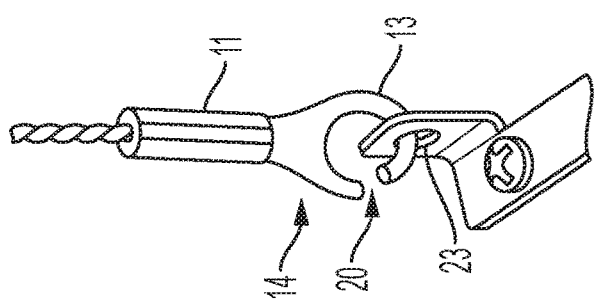

FIGS. 5A-5E illustrate an embodiment whereby the eyelet assembly of FIGS. 1-4 are secured to a grid clip. FIG. 5A shows a commercially available grid clip 21 having projection 22 and hole 23 through the projection. FIG. 5B shows the projection 22 after being bent to a position substantially normal to gird clip 21. FIG. 5C shows the eyelet assembly 10 of FIGS. 1-4 and eyelet portion 12 positioned for insertion through hole 23. FIG. 5D shows first prong 13 inserted through hole 23 and FIG. 5E shows the first and second prongs 13 and 14 being pressed together by pliers 24 to close the slot 20.

FIGS. 6A and 6B respectively depict front and side views of an embodiment of the disclosure wherein eyelet assemblies 10 are secured to each end of wire rope 15, which wire rope passes through gripper 25 having screw means 26 to set placement along wire rope 15.

FIG. 7 depicts cable 27 and loop 28 which may also be secured to gripper 25 and from which a fixture, such as a lighting fixture, may be suspended.

Figure 8:
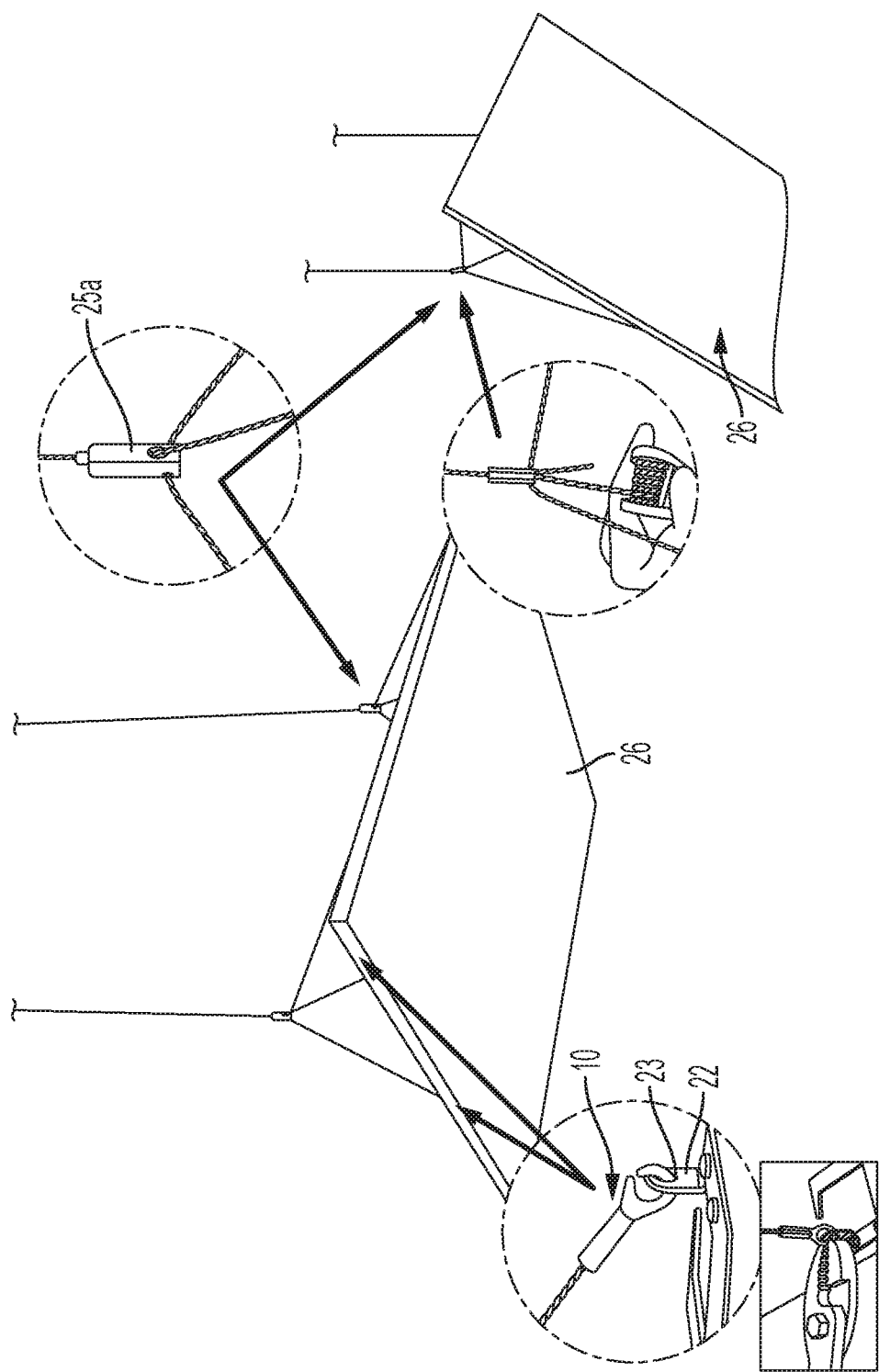

FIG. 8 is illustrates a flat panel LED 26 being hung using eyelet assemblies 10 of the disclosure, including grid clip projection 22 and hoe 23 and a gripper 25a.

What is claimed is:

1. An eyelet assembly comprising:
   a shank; and
   an eyelet portion connected to an end of the shank, the eyelet portion comprising a first prong and a second prong, the first prong being longer than the second prong, the first and second prongs being substantially arcuate and forming a substantially circular aperture, the first and second prongs at an axial angle relative to each other to form a slot.

2. The eyelet assembly of claim 1 wherein the shank is configured to swage around a wire rope and is integrally formed with the eyelet portion and extends along substantially the same axis as the eyelet portion.

3. The eyelet assembly of claim 2 wherein the first prong is about 3 times as long as the second prong, and wherein the axial angle is about 10 to about 30°.

4. A wire rope comprising at least one eyelet assembly of claim 1.

5. A lighting fixture comprising:
   at least one grid clip attached thereto, the grid clip having an outward projection, the outward projection comprising a hole; and
   at least one eyelet assembly comprising: a shank, and an eyelet portion connected to an end of the shank, the eyelet portion, the eyelet portion comprising a first and second prongs being disposed through the hole, the first prong being longer than the second prong, the first and second prongs being substantially arcuate and forming a substantially circular discontinuous aperture.

6. The lighting fixture of claim 5 further comprising a wire rope swaged to the shank.

7. The lighting fixture of claim 6 wherein the lighting fixture is a flat panel LED.

8. A method of suspending a lighting fixture comprising:
   providing a lighting fixture having at least one grid clip attached thereon, the grid clip having an outward projection, the outward projection comprising a hole;
   providing at least one gripper having a wire rope passed therethrough, the wire rope having at an end thereof an eyelet assembly, the eyelet assembly comprising a shank, and an eyelet portion connected to an end of the shank, the eyelet portion comprising a first prong and a second prong, the first prong being longer than the second prong, the first and second prongs being substantially arcuate and forming a substantially circular aperture, the first and second prongs at an axial angle relative to each other to form a slot;
   inserting the first or second prong through the hole and thereafter pressing first and second prongs together to substantially close the slot; and
   suspending the lighting fixture via the at least one gripper.

* * * * *